(12) United States Patent
Pellichero et al.

(10) Patent No.: US 11,120,518 B2
(45) Date of Patent: Sep. 14, 2021

(54) PRE-AUTHORISATION AND PRE-AUTHENTICATION METHOD FOR UTILIZING MOBILITY SERVICES

(71) Applicant: MASTERCARD INTERNATIONAL INCORPORATED, Purchase, NY (US)

(72) Inventors: Aude Pellichero, Paris (FR); Charles Clement-Cottuz, Paris (FR); Damien Simon Moubêche, Paris (FR); Sophie Zellmeyer, Saint-Germain en Laye (FR); Alain Delperdange, Jodoigne-Souveraine (BE); Laurent Bréchon-Cornery, Saint Avertin (FR)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 269 days.

(21) Appl. No.: 16/443,018

(22) Filed: Jun. 17, 2019

(65) Prior Publication Data

US 2019/0385261 A1  Dec. 19, 2019

(30) Foreign Application Priority Data

Jun. 18, 2018 (EP) .................................. 18305755

(51) Int. Cl.
*G06Q 40/00* (2012.01)
*G06Q 50/26* (2012.01)
(Continued)

(52) U.S. Cl.
CPC .......... *G06Q 50/265* (2013.01); *G06F 21/32* (2013.01); *G06Q 20/4012* (2013.01); *G06Q 20/40145* (2013.01); *G06Q 50/30* (2013.01)

(58) Field of Classification Search
CPC ...... G06Q 20/40; G06Q 20/10; G06Q 20/322; G06Q 20/32; G06Q 20/12; G06Q 20/20;
(Continued)

(56) References Cited

U.S. PATENT DOCUMENTS 5,915,023 A * 6/1999 Bernstein ............... G06Q 20/40
705/75
7,280,975 B1 * 10/2007 Donner .................. G06Q 10/02
235/382

(Continued)

FOREIGN PATENT DOCUMENTS

WO    2016/0128569    8/2016

*Primary Examiner* — Jamara A Franklin
(74) *Attorney, Agent, or Firm* — Harness, Dickey & Pierce, P.L.C.

(57) ABSTRACT

A computer-implemented method is provided for authorizing utilization of a mobility service by a user. The method includes establishing a mobility database with an arbiter, wherein the database is associated with the user and includes biographic data, payment data and identification data, and wherein the identification data represents a legal form of identification issued to the user and the payment data represents a form of payment; validating the form of payment and the legal form of identification; requesting, by the user, utilization of the mobility service from a mobility operator; authenticating, by the user, to the mobility operator; requesting authorization to use the mobility service; and providing an authorization if: (a) the payment data represents sufficient funds to pay for the mobility service, and (b) the identification data represents a legal form of identification required for the mobility service.

15 Claims, 3 Drawing Sheets

(51) Int. Cl.
*G06F 21/32* (2013.01)
*G06Q 20/40* (2012.01)
*G06Q 50/30* (2012.01)

(58) Field of Classification Search
CPC .. G06Q 30/06; G06Q 20/401; G06Q 20/4014; G07F 7/1008; G06F 19/00; G06F 21/606
USPC ............ 235/375, 379–382; 705/16, 26.1, 35, 705/38–40, 44
See application file for complete search history.

(56) References Cited

U.S. PATENT DOCUMENTS

| | | | |
|---|---|---|---|
| 7,349,871 B2 * | 3/2008 | Labrou | G06Q 20/02 |
| | | | 705/26.35 |
| 7,600,676 B1 * | 10/2009 | Rados | G06Q 20/40 |
| | | | 235/380 |
| 2004/0059688 A1 | 3/2004 | Dominguez et al. | |
| 2005/0246278 A1 | 11/2005 | Gerber et al. | |
| 2009/0099944 A1 | 4/2009 | Robinson et al. | |
| 2015/0019304 A1 | 1/2015 | Vakili | |
| 2017/0302641 A1 | 10/2017 | Ramatchandirane et al. | |

* cited by examiner

PRE-AUTHORISATION AND PRE-AUTHENTICATION METHOD FOR UTILIZING MOBILITY SERVICES

CROSS-REFERENCE TO RELATED APPLICATION

This application claims the benefit of, and priority to, European Patent Application No. 18305755.3 filed on Jun. 18, 2018. The entire disclosure of the above application is incorporated herein by reference.

FIELD

The present disclosure relates to a computer-implemented method for authorizing utilization of a mobility service by a user.

BACKGROUND

This section provides background information related to the present disclosure which is not necessarily prior art.

World-wide, there are thousands of different mobility services. In recent years, the number of vehicle-sharing programs has increased exponentially, providing many possibilities for the environmentally-conscious users to get around. For example, car, scooter, Segway and bike sharing. However, users of multiple services must deal with each program having its own processes for user registration and everyday usage in many cases, the processes are complex and lengthy. While users may overcome the lengthy process for their daily ride closer to home, it is often a barrier for adoption and utilization when travelling. Users are frequently frustrated by failures in the methods and processes to use the services.

One of the solutions to sustainable development as cities become smarter, is the wide provision of shared mobility and transportation services. They reduce pollution, provide customizable private transportation, and facilitate mobility and exchange in crowded environments. By their nature, they are most useful for short, frequent usage for these shared services, complex and lengthy processes greatly discourage new users from using these services, and have been shown to be a major factor when existing users abandon them completely in favor of ownership of their own mode of transportation.

For the mobility service operators (mobility operators), their profitability is dependent on optimizing usage of the available capacity.

It is an object of the invention to provide simpler and easier processes for users when utilizing mobility services, and in particular when utilizing shared mobility programs at home and abroad.

SUMMARY

This section provides a general summary of the disclosure, and is not a comprehensive disclosure of its full scope or all of its features. Aspects and embodiments of the disclosure are set out in the accompanying claims.

According to a first aspect of the present disclosure, there is provided a computer-implemented method for authorizing utilization of a mobility service by a user, the method comprising: establishing a mobility database with an arbiter, the database being associated with the user and comprising biographic data, payment data and identification data, wherein the identification data represents a legal form of identification issued to the user, and the payment data represents a form of payment; the arbiter validating the form of payment and the legal form of identification; the user requesting utilization of the mobility service from a mobility operator; the user authenticating themselves to the mobility operator; the mobility operator requesting to the arbiter to authorize utilization of the mobility service by the user; the arbiter providing an authorization if: the payment data represents sufficient funds to pay for the mobility service, and the identification data represents a legal form of identification required for the mobility service.

In many cases, it is the authorization of the user before the utilization that makes the processes lengthy and complex. And each mobility service may have widely differing requirements. By using pre-authentication of the legal form of the identification and the form of payment, both the users and mobility operators benefit from a much simplified and much quicker authorization. The invention is based on the insight that these are the two main requirements for authorization by mobility operators world-wide. Consequently, users no longer need to always carry forms of identification and forms of payment. In addition, by having an arbiter providing services to a plurality of mobility operators, users experience less difficulty when using different mobility operators. The mobility operators do not need to invest in many different facilities to validate identification and to process payments a single service does both. As a further advantage, when travelling, there is a lower dependence on the mobility operator being able to read travel documents and operating licenses.

According to a further aspect of the current disclosure, the legal form of identification used with the method may be a legal license issued to the user to operate a vehicle; a travel document issued to the user by a government; a national identification issued to the user by a government; a military identification issued to the user by a government; a residence permit issued to the user by a government; a birth certificate issued by a government; a social security card issued to the user by a government; or any combination thereof.

In existing methods, it is the mobility operator who decides on the form of identification accepted, and this varies widely between operators. Often, they only accept a passport because they are not familiar with other types and cannot judge what is genuine and valid. By using the arbiter to validate the form of identification, a wider range of forms of identification may be used to authenticate the user. As the arbiter will probably use the most up-to-date facilities and services for validation, the risk of fraud is reduced, and the likelihood of acceptance of lesser form of identification will be increased.

According to a further aspect of the current disclosure, the method further comprising that in case of authorization, the arbiter further provides a copy of the identification data to the mobility operator.

Typically, the mobility operator determines the acceptable legal forms of identification for using a mobility service. In many cases, government-regulation and/or insurance conditions may also play a role. These requirements may be transmitted with the authorization request and/or form part of a database associated with the mobility operator. In some cases, the mobility operator may still require a copy of the identification data themselves for their records or, for example, to use biometric data or a portrait photo comprised in the identification data to authenticate the user themselves. Additionally or alternatively, the mobility operator may use the identification data to validate the legal form of identification themselves.

According to another aspect of the current disclosure, the mobility database further comprises permit data representing a legal license issued to the user to operate a vehicle; the method further comprising: the arbiter validating the legal license; and the arbiter providing the authorization if: the permit data represents a legal license required by the mobility operator for the mobility service.

Although an operating permit or license may optionally be provided as the legal form of identification, many mobility services, such as for trucks, cars, motorcycles, boats, scooters, require by law that the user is in possession of the correct operating permit, such as driver's license. In many cases, both a legal form of identification and legal license are required by the mobility operator. By performing a similar pre-authentication for the legal license, it is no longer needed that the user carries this additional card or document, having to rely on it being physically present when being authorized to use a mobility service.

In some, the mobility operator may still require a copy of the legal license themselves for their records or, for example, to use biometric data or a portrait photo comprised in the permit data to authenticate the user themselves. Additionally or alternatively, the mobility operator may use the permit to validate the legal license themselves. The method then further comprises: that in case of authorization, the arbiter further provides a copy of the permit data to the mobility operator.

In yet another aspect of the current disclosure, the method further comprises: the arbiter checking that the data in the mobility database complies with one or more additional requirement; and the arbiter refusing the authorization if the one or more additional requirement is not complied with.

To support a wide-range of mobility services all over the world, it may be advantageous to allow a high degree of customization on the conditions for authorizing use of each mobility service. These conditions may be imposed, for example, by the arbiter, by the mobility operator, by the applicable government, by the applicable local government, by a trade organization, or a combination thereof. These additional requirements may be transmitted with the authorization request and/or form part of a database.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

Corresponding reference numerals indicate corresponding parts throughout the several views of the drawings.

DETAILED DESCRIPTION

Embodiments will be described, by way of example only, with reference to the drawings. The description and specific examples included herein are intended for purposes of illustration only and are not intended to limit the scope of the present disclosure. In the following detailed description, numerous non-limiting specific details are given to assist in understanding this disclosure. It will be obvious to a person skilled in the art that the method may be implemented on any type of standalone system or client-server compatible system containing any type of client, network, server, and database elements.

Figure 1:
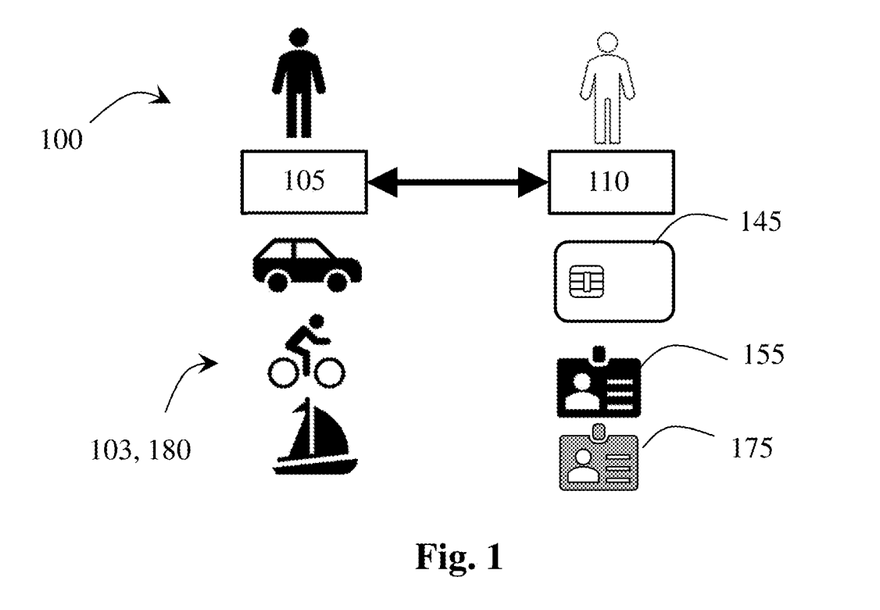
FIG. 1 depicts a typical computer-implemented method for authorizing utilization of a mobility service.

FIG. 1 depicts a typical computer-implemented method 100 for authorizing utilization of a mobility service. A user 110 presents himself to a mobility operator (MO) 105, who offers one or more mobility services 103 typically, the utilization of a vehicle 180 such as a car, motorcycle, bicycle or boat will be comprised in the mobility service 103. The user 110 carries a form of payment 145, a legal form of identification 155, and usually also a legal permit 175 or license to operate the vehicle 180.

If the user 110 wishes to utilize a vehicle 180, the user 110 first contacts the MO 105 this may be at a physical location, online or through a mobile device app. The MO 105 usually requires payment for the service 103, so the user 110 must provide a form of payment 145, such as a credit card or bank card, which the MO 105 must validate in some way to determine, for example, whether the user 110 has sufficient funds to pay for the mobility service 103.

In addition, the MO 105 typically requires a legal form of identification 155, such as a travel document issued to the user 110 by a government, like a passport. This must also be validated by the MO 105 to determine whether it is genuine and valid. In some cases, local law may legislate that the MO 105 require seeing it as a condition of using the mobility service 103. It may be a condition of the insurance policies that the MO 105 has taken out. It may also be used to authenticate the name of the user 110 when being compared to the form of payment 145 offered. In other cases, the MO 105 requires it in case of possible problems, such as the user 110 damaging an object or vehicle 180 comprised in the mobility service 103. In extreme cases, objects or vehicles 180 may not be returned at all, requiring subsequent legal steps to pursue the user 110 to return the objects or vehicle 180, or to compensate the MO 105.

In many cases, there are local restrictions on who can operate a vehicle 180, so the MO 105 will typically also require a legal license 175 or permit issued to the user 110. Again, this must be validated by the MO 105 to determine whether it is genuine and valid, and provides the correct permission required to operate the vehicle 180. Some MO's 105 may accept the legal license 175 as a form of identification 155, allowing some simplification in this process.

After validating the form of payment 145 and the legal form of identification 155, the MO 105 will authorize the user 110 to utilize the mobility service 103. Where necessary, the legal license 175 must also be first validated before authorization.

For the MO 105, this is a lengthy and complex procedure, which requires sufficient knowledge and facilities to do the validation. This validation may be a combination of physical and online actions, which may require data to be manually entered into a computer system. The forms 155, 175 may be copied and/or scanned. Whatever the process, the MO 105 must continuously invest time and effort into acquiring and learning how to use these facilities. In addition, mistakes can be made in entering the data, or online access to validation services may be interrupted, leading to the mobility service 103 not being utilized, and loss of revenue for the MO 105.

For the user 110, it is also a length and complex procedure, requiring the user 110 to carry a form of payment 145, a legal form of identification 155, and in many cases, a legal license 175. It is very inconvenient if any of the validation processes fail because the user 110 may be relying on making use of the mobility service 103 to travel for an appointment. In addition, forms of payments 145, forms of identification 155 and legal licenses 175 can be lost, damaged or simply expire.

These problems become much greater and problematic when travelling to a different country. Besides language barriers and cultural differences, the MO 105 may be faced with validating foreign forms of payment 145, forms of identification 155 and licenses 175. Usually, they require both a legal form of identification 155 and a legal license 175 to reduce the possibility of fraud.

The user 110 is usually forced to anticipate potential problems before travel, but current solutions, such as International Driving Permits (or Licenses), only add to the complexity. Even if a reservation is made online before travel, the form of payment 145 and at least one form of identification 155, 175 must often be physically presented before the utilization is actually authorized.

Figure 2:
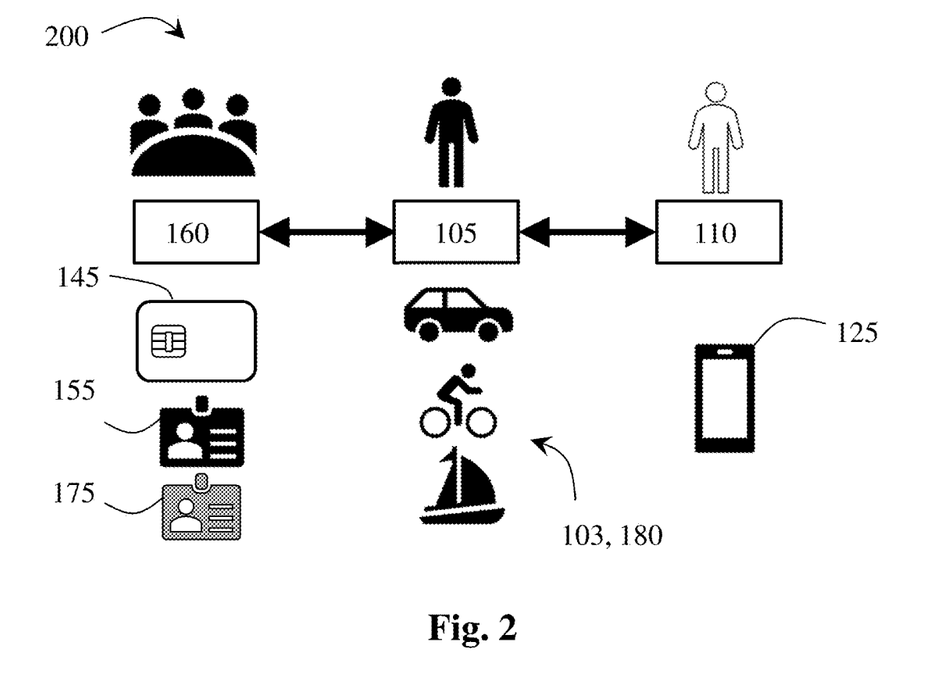
FIG. 2 depicts an improved computer-implemented method for authorizing utilization of a mobility service.

FIG. 2 depicts an improved computer-implemented method 200 for authorizing utilization of a mobility service. The same user 110 presents himself to the same mobility operator (MO) 105, offering one or more mobility services 103. In this case, the user 110 carries a form of authentication, such as a mobile device 125.

Again, the mobility services 103 typically include the utilization of a vehicle 180. Again, the user 110 who wishes to utilize a vehicle 180, the user 110 first contacts the MO 105 at physical location, online, through a mobile device app, or a combination thereof.

In this case, the MO 105 has established an arrangement with a mobility service arbiter 160. Alternatively, the arrangement may also be established when the user 110 contacts the MO 105, but it is preferably established earlier to speed up the authorization of the mobility service 103. The mobility service arbiter 160 may be described as a secure vault that gathers data for mobility services.

Figure 3:
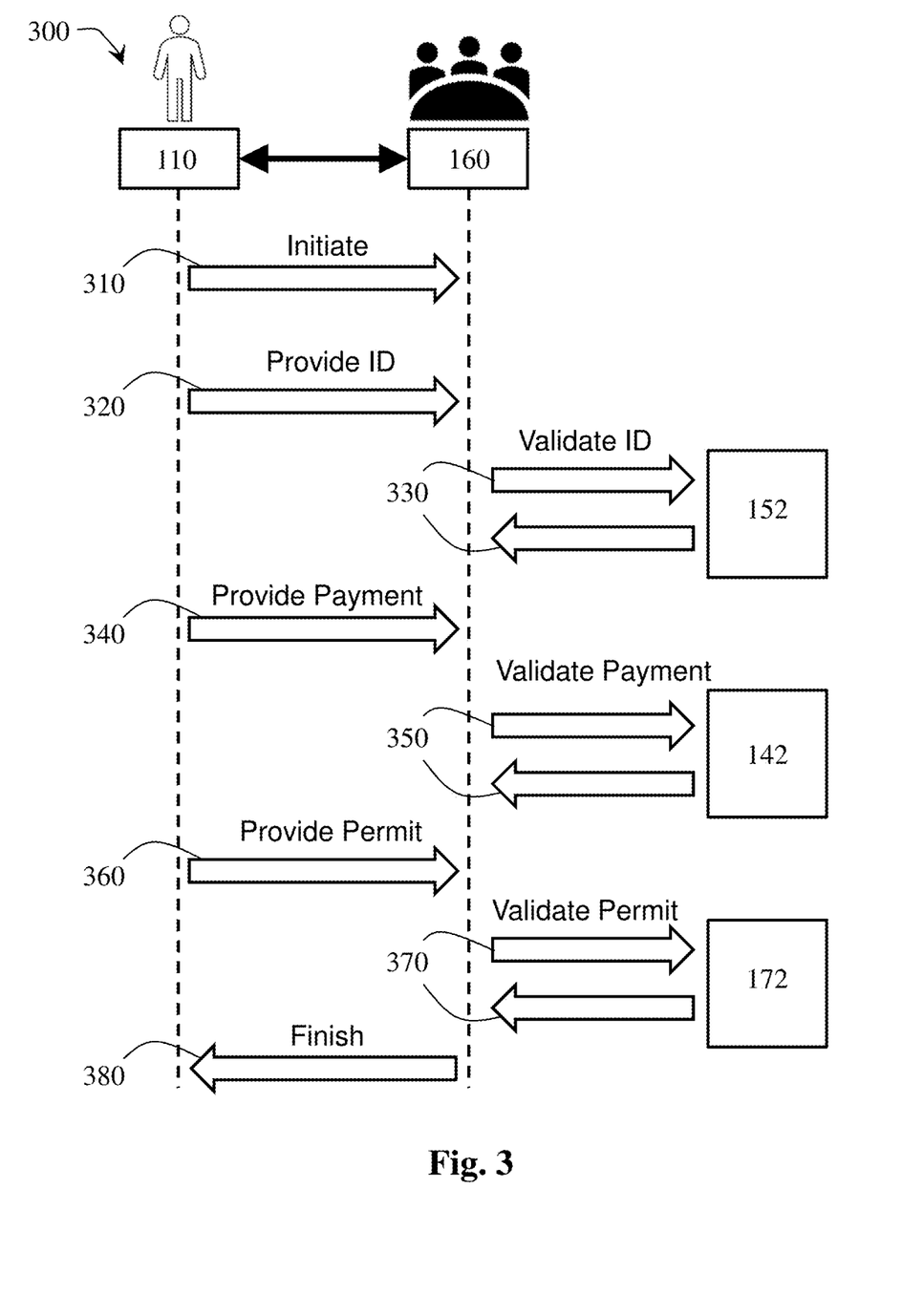
FIG. 3 depicts a computer-implemented method for a user to establish an arrangement with an arbiter.

In this case, the user 110 has established an arrangement 300 with the arbiter 160 before contacting the MO 105. Alternatively, the arrangement 300 may also be established when the user 110 contacts the MO 105, but it is preferably established earlier to speed up the authorization of the mobility service 103, and to reduce the forms of identification 155 and forms of payment 145 which need to be carried.

The user 110 identifies to the MO 105 that they have established an arrangement with the arbiter 160. They could do this in any convenient way if online, the MO website could provide the opportunity for the user 110 to login to their account with the arbiter 160 using their username. Authentication may then be provided in any convenient form, such as one comprising a user name, an email address, a password, a pass phrase, a PIN, a challenge response, a security question, a QR code, a signature, a biometric identifier, a fingerprint, a security token, a software token, a hardware token, a voice scan, a face scan, a photograph of the user, or any combination thereof. An RFID smartcard and/or mobile device 125, may be used, to provide the authentication.

If using a mobile device 125, they may use an app provided by the MO 105, and similarly indicate their wish to identify and authenticate their account with the arbiter 160. A password may also be used. Additionally or alternatively, a more secure authentication, such as an RFID smart card, biometrics scanning, fingerprint scanning, face recognition, a self-portrait photo (selfie) may be used, utilizing the appropriate functionality of the mobile device 125. The arbiter 160 may provide their own software, such as an API, for use in the MO app, or even provide their own app to the user 110 of the mobile device 125.

The type of authentication accepted may be determined by the MO 105 and/or the user 110 and/or the arbiter 160, taking into account local, regional, national and international regulations, rules and best practices. A further advantage of the improved method 200 is that the authentication provided by the user 110 when requesting authorization to utilize the mobility service 103 may be less-secure than the one or more authentications provided when establishing the relationship (or arrangement 300) between the user 110 and the arbiter 160. This means that a wide-range of mobility services may be easily utilized by carrying, for example a single RFID card, or a single a mobile device 125 with appropriate hardware and software. It also means that a wide-range of mobility services may be easily utilized by typing in just a username and password, or providing a fingerprint or allowing the MO 105 to take a portrait photo in such cases, nothing needs to be carried at all.

The user 110 sends a user request to the MO 105 for authorization to use the mobility service 103 required. In general, the request may comprise specific service data such as category and type of vehicle 180, start time, duration, pick-up point, drop-off point.

The MO 105 sends an MO request to the arbiter 160 for authorization of the user to use the mobility service 103 requested. Although the MO request may comprise other parameters, it comprises two main parts:
- a request to check that user 110 has sufficient funds to pay for the mobility service 103, and
- a request to check that the user 110 has a legal form of identification required by the mobility operator 105 for the mobility service 103.

The arbiter 160 compares the MO request with the data stored in the mobile database 120 associated with the user 110. The arbiter 160 checks if:
- the payment data 140 represents sufficient funds to pay for the mobility service 103, and
- the identification data 150 represents a legal form of identification required by the mobility operator 105 for the mobility service 103.

If both conditions are complied with, the arbiter 160 provides the MO 105 with authorization. If either condition is not complied with, authorization is refused. Refusal is preferably transmitted to inform the MO 105 clearly about the status, although the method may also be implemented with a time-out if the authorization takes too long, the MO 105 will consider that to be a refusal.

A refusal will also be provided if either the payment data 140 or the identification data 150 has not yet been validated, or an earlier validation has been reversed. For example, if the legal form of identification 155 or form of payment 145 expires, the validation will be reversed.

Other possible reasons for a refusal may be that there is no relationship established between the user 110 and the arbiter 160, or no relationship established between the MO 105 and the arbiter 160. Optionally, the method 200 may be further adapted to allow the missing relationship to be established at the moment of request the authorization request to the arbiter 160 is interrupted, allowing the missing relationship to be established. The authorization request will then be resumed.

To establish the relationship between user 110 and the arbiter 160, the onboarding method (or arrangement 300) described herein should preferably be carried out. Optionally, one or more parts of the onboarding method may be performed at the moment of request, and the rest of the method may be performed sometime later.

Authorization to utilize the service 103 will be much easier and faster if the user 110 establishes the mobility database 120 with the arbiter 160 before the user 110 authenticates themselves to the mobility operator 105. Also, authorization to utilize the service 103 will be much easier and faster if the arbiter 160 validates the payment data 140 and identification data (150) before the user 110 authenticates themselves to the mobility operator 105.

Establishing the relationship between the arbiter 160 and user 110 should preferably be done a long time before (pre-registration), or at least some of the parts. Several minutes, or even hours, earlier is particularly preferred this means that the user 100 may establish the relationship from their residence or hotel, reducing the documents and cards that they need to carry to utilize the service.

Optionally, a user 110 already registered with an MO 105 may convert this to a relationship with the arbiter 160 if the MO registration comprises data representing a legal form of identification and a form of payment. The user 110 may use the website of the MO 105, or their app, or a combination thereof.

To perform the comparison, the arbiter 160 needs to know, at least, the cost of the mobility service 103 requested, and the requirements of the MO 105 regarding the legal form of identification. These additional requirements may be provided by the MO 105 together with the authorization request. Additionally or alternatively, the arbiter 160 may store relevant data on the MO 105 in a database, and use this data for the comparison. In practice, a combination of both request parameters and MO database parameters will typically be used.

It may be advantageous to include supplementary data with any refusal from the arbiter 160 so that the MO 105 may inform the user 110 and/or take corrective action. Following the receipt of a refusal, the MO 105 may modify the request and request a modified authorization. For example, if the authorization is refused due to insufficient funds only, the MO 105 may then allow the user 110 to pay using a different form of payment as the legal identification was successful. If the authorization is refused due to an incorrect or insufficient legal identification only, the MO 105 may then allow the user 110 to identify themselves using a different form of identification as the check on sufficient funds was successful.

After providing the MO 105 with the authorization, the arbiter 160 arranges for the funds for utilization of the mobility service 103 to be transferred to the MO 105 using the payment data 140. The arbiter 160 may optionally confirm to the MO 105 that the funds have been paid.

Alternatively or additionally, the arbiter 160 may provide a copy of the payment data 170 to the MO 105, allowing the MO 105 to transfer some or all the funds themselves.

For some mobility services 103 and/or for some MO's 105, it may be preferred for the arbiter 160 to provide a copy of the identification data 150 to the mobility operator 105. For example, many forms of legal identification 155 comprise a portrait photograph the MO 105 could then check whether the appearance of the user 110 matches this portrait photograph. Similarly, it may also be advantageous to provide a copy of any permit data 170 to the MO 105.

The improved computer-implemented method 200 for authorizing utilization of a mobility service provides many improvements compared to methods known in the art. Advantages for the user 110 are:

- mobility services may be authorized without needing to carry a form of payment 145 and a legal form of identification 155. These may be left at home, or if travelling, left in the hotel safe.
- enrolment with each new MO 105 is greatly simplified, making it much more likely that the user will use new MO's 105. The improved methods described herein 200 may be so automated that the user 110 does not even realize that enrolment with a new MO 105 has taken place.
- authentication may be performed in some case with just a username and password. However, the preferred authentication uses appropriate software apps on a mobile device 125 together with a biometric scan.
- more protection from financial fraud because the funds are transferred to the MO 105 via the arbiter 160 without the MO 105 getting physical access to a credit card. If the payment data 140 is provided to an MO 105 for recordkeeping, then PAN masking or truncation may be used. Alternatively or additionally, the card credentials may be tokenized, using, for example MDES (Mastercard Digital Enablement Service).
- more protection from identify theft because the mobility services 103 are utilized without the MO 105 getting physical access to the legal form of identification 155 or legal license 175. If the identification data 150 or permit data 170 is provided to an MO 105 for recordkeeping, then masking or truncation may be used for the ID numbers.
- reduction in the liability risks for the MO 105 because they may choose to leave the handling of sensitive data, like Personally Identifiable Information (PII) or Sensitive Personal Information (SPI), to the arbiter.

Advantages for the MO 105 are:

more protection against fraud as payment after authorization by the arbiter 160 is guaranteed.

a simple and quick way to allow new users 110 to utilize their mobility services 103, making it more likely that new users 110 will choose them.

validation of legal forms of identification 155 and legal permits 175 are performed centrally by the arbiter 160 using the latest on-line applications and data. The MO 105 does therefore not need to invest in expensive validation services and equipment. This is particularly advantageous if the MO 105 is a private person who wishes to share one or more vehicles with others.

it is more difficult for those trying to get access to mobility services 103 with lost or stolen forms of identification 155, 175 and payment 145. The accounts of the user 110 may be quickly blocked, so that authorization requests for that user 110 are refused.

it may be advantageous for an MO 105 to provide mobility services 103 exclusively using the improved method 200. Such users 110 are easier to trace, which may reduce the likelihood of theft of objects and/or vehicles 180. In cases of damage to the objects and/or vehicles 180, the data retained by the arbiter 160 may also make it easier to claim compensation.

Additionally, a refusal may also be provided if:
no relationship has yet been (validly) established between the MO 105 and the arbiter 160, or an existing relationship has been terminated/blocked; or
no relationship has yet been (validly) established between the user 110 and the arbiter 160, or an existing relationship has been terminated/blocked.

As mentioned above, the authorization/refusal options may be further fine-tuned by providing additional requirements with the request from the MO 105 to the arbiter 160 and/or the arbiter 160 maintaining an MO database. After the arbiter 160 has checked that the data in the mobility database 120 complies with one or more additional requirement, the arbiter 160 either: provides a refusal to the MO 105 if the one or more additional requirement is not complied with, or provides an authorization to the mobility Examples of additional requirements include: the form of identification, the age of the user, the address of the user, the nationality of the user, the country of residence of the user, the expiry date of the form of identification, a correct form of insurance, a valid form of insurance, a minimum user rating, a minimum amount of previous usage, a minimum duration since the establishing of the relationship of the user with the arbiter, or any combination thereof.

In most cases, the mobility operator 105 should comply with local, regional, governmental and international laws, regulations, rules and best practices. These vary so widely world-wide, that customization is preferred. These additional requirements may be transmitted with the authorization request and/or form part of a database: this may be a database associated with the MO 105, the mobility database 120 associated with the user 100, a separate database or any combination thereof. For example, the arbiter 160 may maintain a database based on legal requirements and/or actual usage related to mobility services 103 or particular vehicles 180 for example:

to operate a car, the user 110 must be 21 years of age or older and present a valid driver's license;
to operate a scooter, the user 110 must be 16 years of age or older;
to operate a bicycle in Beijing, any non-Chinese user 110 must be 18 years of age and present a valid passport valid for at least 6 months;
to rent an expensive sports car, a minimum user rating may be required;
to rent a motorcycle in Barcelona, the user must be a Spanish national or resident.

FIG. 3 depicts the computer-implemented method (or arrangement 300) for the user 110 to establish an arrangement with the arbiter 160. This may also be called registration, on-boarding or enrolment. The user initiates 310 the arrangement, provides ID 320 to the arbiter 160, provides payment 340 to the arbiter 160, optionally provides a permit 360, and finally finishes 380 the registration. The arbiter 160 validates the ID 330, validates the payment 350 and optionally validates the permit 370.

The user 110 contacts the arbiter 160 at a physical location, online, through a mobile device app, or a combination thereof. The user 110 then initiates 310 establishment of the arrangement for example, by requesting a form, by supplying an email address to be contacted on or by supplying a proposed user name and password. In other words, initiates 310 registration.

Figure 4:
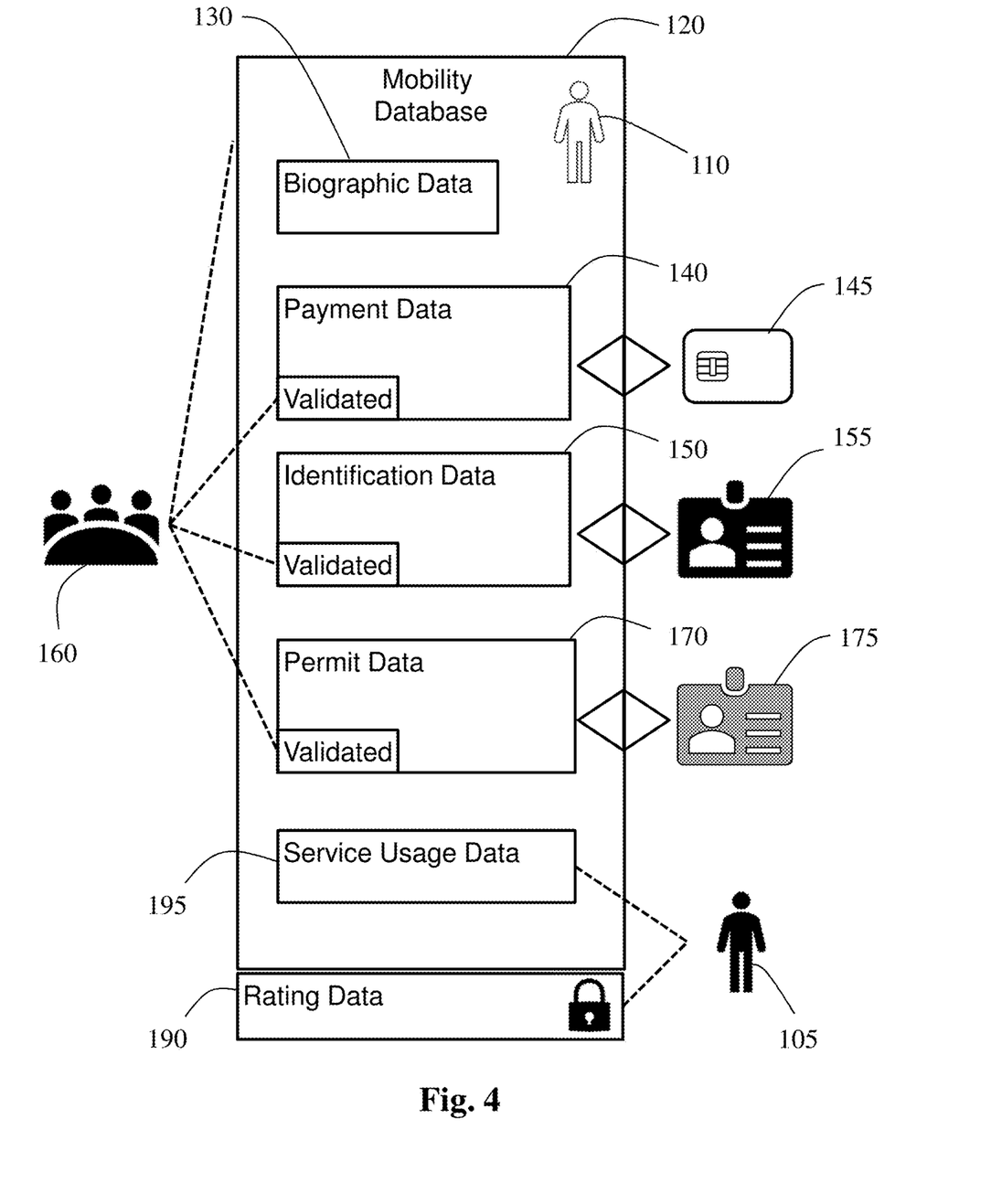
FIG. 4 depicts the possible contents of a mobility database associated with a user.

Upon initiation, a mobility database 120 may be created associated with the user 110 FIG. 4 depicts the possible contents of such a database it may comprise biographic data 130, payment data 140, a validation indicator for the payment data 140, identification data 150, a validation indicator for the identification data 150, permit data 170, a validation indicator for the permit data 170, service usage data 195 and rating data 190. The user 110 typically has access to all data, except the rating data 190. The arbiter 160 typically has access to at least the same data as the user 110. The MO's 105 typically have access to the service usage data 195 and the rating data 190.

Optionally in FIG. 3, the user 110 may be required to provide biographic data 130, such as first name, last name, address, date of birth, email address, portrait picture and mobile phone number. These may be provided at any time that is, during the establishment of the arrangement 300 with the arbiter 160 or later. Some of this biographic data 130 may also be obtained during the validation of the payment and identification (see below).

Authentication of the user 110 to the arbiter 160 should also be defined during initiation 310. Any convenient form of authentication may be used, such as one comprising a user name, an email address, a password, a pass phrase, a PIN, a challenge response, a security question, a QR code, a signature, a biometric identifier, a fingerprint, a security token, a software token, a hardware token, a voice scan, a face scan, a photograph of the user, or any combination thereof. An RFID smartcard and/or mobile device, may be used, to provide the authentication. The biographic data 130 will comprise the data required to support one or more authentication. This may be the same authentication used to authenticate the user 110 to the MO 105, a different one, or a temporary one.

The user 110 is required to provide 320 a legal form of identification 155 to the arbiter 160 for validation for example, a legal license 175 issued to the user 110 to operate a vehicle 180 (Driver's License or Driver's Permit), a travel document (Passport or Travel ID); a national identification, a military identification or a residence permit. It should be issued to the user 110. Preferably, it has been issued by a government such forms of identification are restricted and difficult to obtain, reducing the risk of fraud. Preferably, it also comprises a portrait photograph or biometric data to further reduce the risk of fraud. However, the arbiter 160 may also accept "less-secure" forms such as a social security card or birth certificate and perform a more rigorous validation.

Optionally, the user 110 may receive an indication of the suitability of the form of identification 155 for the intended purpose for example, a passport is generally considered the gold standard form of identification and will likely allow the use of the widest range of mobility service 103 world-wide. A residence permit may only be accepted for mobility services 103 within the country of residence. It may also be advantageous to provide and validate more than one form of identification as this would increase the chance of acceptance at MO's throughout the world.

Depending on how the form of identification 155 is transmitted to the arbiter 160, a representation will be stored as identification data 150 in the mobility database 120. For example, if the user 110 scans or takes a picture of the identification 155, the identification data 150 may comprise the image. In some cases, it may be sufficient for the user to just enter data, such as the document number, place and date of issue, date of expiry and type of document these details will then be comprised in the identification data 150. Data from the identification data 150 may be copied to the biographic data 130.

Optionally, the user 110 may receive an indication of the suitability of the form of identification 155 transmitted for the intended purpose for example, some MO's 105 may need access to an image of suitable resolution for visual verification, particularly if the identification comprises a portrait photograph.

After receiving the form of identification 155, the arbiter 160 validates 330 the identification to see if it is valid and genuine. They may do that themselves, or they may use an identification validator 152 as depicted in FIG. 3. This may be manual, automatic, or a combination. Automatic validator services 152 may be used like IDCHECK.IO, ONFIDO, IDNOW or Mitek Mobile Verify. After successful validation, the status may be recorded as part of the identification data 150.

The user 110 is further required to provide 340 a form of payment to the arbiter 160 for validation. Although the arbiter 160 may charge a fee for establishing and maintaining the arrangement with the user 110, for example as a one-off registration fee or a regular subscription, the main reason to provide a form of payment 145 is for pre-authentication for subsequent authorizations for MO's 103.

For example, a credit card, debit card or bank card may be provided. Preferably, any credit card has been issued by a major issuer, such as Mastercard, who take steps to reduce the risk of misuse and fraud. The arbiter 160 may also accept "less-secure" forms such as a bank account or PayPal details, and perform a more rigorous validation including a test transaction.

Optionally, the user 110 may receive an indication of the suitability of the form of payment 155 for the intended purpose for example, a credit card account is generally considered the gold standard for payment acceptance and will likely allow the use of the widest range of mobility service 103 world-wide. A national bank account may not allow foreign transactions to be carried out directly.

It may also be advantageous to provide and validate more than one form of payment as this would increase the chance of acceptance at MO's 105 throughout the world.

Depending on how the form of payment 145 is transmitted to the arbiter 160, a representation will be stored as payment data 140 in the mobility database 120. For example, if the user 110 uses a software app on a mobile device, the payment data 140 may be configured to comprise tokenized card credentials within a mobile wallet on the mobile device, preferably being strictly linked to the mobile device, so that subsequent payments directly to the MO's 105 may be made. Such apps include Samsung Pay, Android Pay and Apple Pay. An electronic wallet, such as Masterpass, may similarly be used. If using a credit or debit card, the user 110 may provide the card holder name, card number, expiry date and CVV code.

It may be advantageous for the payment data 140 to be configured as a credit card or debit card account. For example, if the user 110 provides bank account details, together with authorization to the arbiter 160 to withdraw funds from this bank account, the payment data 140 may be configured to provide payments to the MO's 105 when an authorization request is received to utilize a mobility service 103. This is particularly advantageous if the arbiter 160 is also an issuer of credit and debit cards.

Additionally, the payment data 140 may comprise additional requirements for approving an authorization request from MO's 103 for example, maximum amounts per authorization, maximum amounts per day, restrictions in the mobility services 103 to be authorized, and restrictions on geographical locations of the services 103.

Additionally or alternatively, the payment data 140 may comprise one or more payment tokens to be used for subsequent transactions.

After receiving the form of payment 145, the arbiter 160 validates 350 the form of payment to see if it is valid and genuine. They may do that themselves, or they may use a payment validator 142 as depicted in FIG. 3. This may be manual, automatic, or a combination. A zero-amount transaction to the issuer may also be used. Online validation services 142 such as CallValidate may be used, a test transaction or validating with the financial institution who issued the card or operate the account. After successful validation, the status may be recorded as part of the payment data 140.

In some cases, such as when using 3DS authentication like MasterCard SecureCode to validate, the user 110 may be requested to provide further data, such as a password, to complete the validation 350 of the form of payment.

After successful payment validation 350 and successful identification validation 330, the arbiter 160 then contacts the user 110 to finish 380 establishing the arrangement that is, finish 380 the registration. The user 110 may subsequently contact MO's 105 to authorize utilization of mobility services 103 using the mobility database 120.

Many forms of vehicles 180, particularly motorized ones, require the operator to possess a suitable legal operating permit or license. If the legal form of identification 155 provided 320 and validated 330 is not such an operating permit, it may be advantageous to allow the user 110 to add the data to the mobility database 120.

Either during the registration or some time afterwards, the user 110 may provide 360 a legal license or permit 175 to the arbiter 160 for validation for example, a Driver's License or Driver's Permit. Preferably, it has been issued by a government such forms of identification are restricted and difficult to obtain, reducing the risk of fraud. Preferably, it also comprises a portrait photograph or biometric data to further reduce the risk of fraud.

Optionally, the user 110 may receive an indication of the suitability of the legal permit 175 for the intended purpose for example, a Driver's License for a car or truck will likely allow the use of the widest range of mobility service 103 world-wide. A Driver's License for a motorcycle may only be accepted for mobility services 103 comprising motorcycles and not cars or trucks. Legal permits 175 also may have geographical restrictions. It may also be advantageous to provide and validate more than legal permit as this would increase the chance of acceptance at MO's throughout the world.

Depending on how the legal permit 175 is transmitted to the arbiter 160, a representation will be stored as permit data 170 in the mobility database 120. For example, if the user 110 scans or takes a picture of the permit 175, the permit data 170 may comprise the image. In some cases, it may be sufficient for the user to just enter data, such as the document number, place and date of issue, date of expiry, and classes of vehicle the user may operate these details will then be comprised in the permit data 170. Data from the permit data 170 may be copied to the biographic data 130.

Optionally, the user 110 may receive an indication of the suitability of the legal permit 175 transmitted for the intended purpose for example, some MO's 105 may need access to an image of suitable resolution for visual verification, particularly if the identification comprises a portrait photograph.

After receiving the legal license 175, the arbiter 160 validates 370 the identification to see if it is valid and genuine. They may do that themselves, or they may use a license validator 172 as depicted in FIG. 3. This may be manual, automatic, or a combination. Automatic validator services 152 for forms of identification 155, like IDCHECK.IO, ONFIDO, IDNOW or Mitek Mobile Verify, also typically validate legal licenses. After successful validation, the status may be recorded as part of the permit data 170.

Optionally, the mobility database 120 may be further configured to comprise service usage data 195 associated with the user 110. For the user 110, this may provide a record of mobility services 103 used in the past. For the arbiter 160 and/or MO's 105, this may be used to offer additional services and/or discounts if a certain amount of usage is achieved for example, as a loyalty program. Optionally, this usage data 195 and/or appropriate analytical metrics, such as an amount of previous usage, may be provided to MO's 105. The usage data 195 and/or analytical metrics may also be used to define an additional requirement for service authorization for example, some MO's 105 may only allow frequent users to use their service, or long-time users. Additionally or alternatively, they may charge a different rate for such users or give them priority when reserving.

The usage data 195 may comprise, for example, details of each service utilization such as MO 105, start of utilization, pick-up location, drop-off location, distance travelled and duration of utilization. The user 110 may also be asked to provide a user rating of the utilization experience, and comments, which may be added to the service usage data 195.

It may also be advantageous to allow the MO's 105 to access this usage data 195. In particular, they may like to know how often the user 110 uses their services 103, what the user 110 thought of their mobility services 103 and ideas to improve the experience found in the comments. They may also like to know relevant details from the biographic data 130. Additionally or alternatively, the arbiter 160 may also provide this usage data 195 and/or analytical metrics to other MO's 105, not just the ones that the user 110 has actually utilized.

Optionally, the mobility database 120 may be further configured to comprise rating data 190 associated with the user 110. This may comprise information and experiences provided by the arbiter 160 and/or the MO's 105. For example, if a user 110 has damaged a vehicle 180 and/or object comprised in the mobility services 103.

For the arbiter 160 and/or MO's, this may be used to offer additional services and/or discounts if a certain minimum rating is achieved for example, as a loyalty program. Optionally, this rating data 190 and/or appropriate analytical metrics, such as the minimum rating, may be provided to MO's 105. The rating data 190 and/or analytical metrics may also be used to define an additional requirement for service authorization for example, some MO's 105 may only allow users with a minimum rating to use their service. Additionally or alternatively, they may charge a different rate for such users or give them priority when reserving.

It may also be advantageous to allow the MO's 105 to access this rating data 190. In particular, they may like to know responsibly the user 110 uses their services 103 and how trustworthy they are. This means that good behavior may be rewarded, and bad behavior punished—users 110 who, for example, do not return objects and/or vehicles, or damage them, or return them to the wrong place, are given a lower rating. In extreme cases users 110 may be put on a blacklist and blocked from utilizing mobility services 103 from a particular MO 103. This is expected to further reduce the risk of theft or damaged objects and/or vehicles. Optionally, the user 110 may be able to view their rating data 190, or at least an analytical metric such as average MO 105 rating.

Additionally or alternatively, the arbiter 160 may also provide this rating data 190 and/or analytical metrics to other MO's 105, not just the ones that the user 110 has actually utilized. This provides a further advantage when using these improved methods 200 users who receive a bad rating from one or more MO 105 may also be punished, or discouraged, when trying to get authorization 160 to use the mobility services 103 of a different MO 105. When using methods known in the art, this is very difficult.

Optionally, the mobility database 120 may be further configured to provide reminders to the user 110 that the forms of payment 145, identification 155 and/or permits 175 that have been validated are due to expire within a certain period of time. This may further decrease the risk of authorization failure when utilizing mobility services 103 worldwide and improve reliability. Additionally or alternatively, reminders may be sent to the MO 105 and/or the arbiter 160 for their own use, or for relaying the reminders to the user 110.

Optionally, insurance data may also be comprised in the mobility database 120, such as travel insurance. For example, this data may be used to restrict the authorizations for certain types of mobility services 103, and to restrict the geographical locations of the services 103. This is particularly advantageous if the arbiter 160 is also an insurance seller or broker, or an issuer of credit and debit cards as insurance is often provided as part of the services.

The mobility database 120 may be stored in a single computer location, such as a central server, distributed over two or more computer systems, such as a client and server part, or distributed over a plurality of systems and devices.

Currently, mobility services 103 offered are frequently limited to motorized vehicles 180, such as trucks, cars, motorcycles, scooters, and boats because of the higher charges that can be made these charges cover the operating overhead and risks due to theft, damage and fraud. Using the improved methods described herein, the overhead and risks for mobility operators 105 are greatly reduced, allowing lower charges to be made and therefore allowing them to offer a broader range of mobility service 103. They can offer:

- motorized vehicles, such as trucks, busses, cars, motorcycles, scooters, and boats with reduced overhead. Also Segways, off-road vehicles, motorized wheelchairs, handicapped scooters, for example may be offered. In addition, the flexibility which allows multiple additional legal identification and permits to be comprised in the improved methods, makes it possible for the mobility operators 105 to offer services 103 comprising helicopters, airplanes, hot-air balloons, submarines, for example.
- human-powered vehicles, such as quadracycles, bicycles, tricycles, pedalos and rickshaws, with reduced overhead. Using the improved methods described herein, mobility services 103 may be also offered comprising skateboards, canoes, rowing boats, for example. Other services 103 comprising mobility objects, such as in-line skates, roller-skates, ice-skates, skis, snowboards, sleds, surfboards, diving gear, for example.
- animal-powered vehicles, such as carriages, carts and coaches, with reduced overhead. Using the improved methods described herein, mobility services 103 may be also offered comprising animals, such as horses, camels, mules, for example.

autonomous (also called driverless, self-driving and robotic) vehicles, such as trucks, busses, cars, motorcycles, scooters, boats, motorized versions of usually human-powered vehicles and motorized versions of usually animal-powered vehicles. The invention may help to reduce risk for the MO's 105 by simplifying the verification that the user 110 possess the correct insurance. In addition, the improved reliability using the invention may mean that a user 110 is more likely to use an autonomous vehicle, particularly when the mobility services of multiple MO's 105 may need to be utilized in a single trip or on a single day.

human-powered and/or animal-powered vehicles that are partially motorized. For example: an electrical bicycle may be configured and arranged to assist the human powering it, the human may engage a motor assistance only going up an incline or engage it when they are moving against a wind.

human-powered and/or animal-powered vehicles that are partially autonomous. For example: a vehicle that is sent autonomously to a location of the user 110, which the user 110 may utilize freely after authorization. Additionally or alternatively, the vehicle may be sent autonomously back to the MO 105 when the service is completed.

By reducing overhead and risk, mobility-sharing options become more attractive and the likelihood of use will increase greatly. In addition, the improved methods described herein reduce the complexity to a degree that private persons wishing to share their own mobility objects and/or vehicles 180 may easily become MO's 105 themselves. In addition, the user 110 is more likely to utilize the mobility services 103 offered by private persons because of increased convenience.

In addition, it also allows more co-operation between MO's 105—for example, it becomes easier to share pick-up and drop-off points. Payments may also be easily shared.

As a further advantage, the increased reliability and expected reduction in fraud and theft may allow some MO's 105 to no longer charge a deposit when the utilization is authorized. Currently, this requirement by many MO's 105 means that authorizations are frequently interrupted or refused because the user 110 has insufficient funds to cover the deposit, which may be a multiple of the amount to be charged for using the mobility service 103.

Although the mobility services 103 described herein refer to a user 110, the improved methods may be implemented with more than one user 110. The mobility service 103 may be limited to, for example, a place inside a vehicle 180. There may be distinctions between such places, such as an operator of the vehicle 180, or a non-operator. Additionally or alternatively, more than one user 110 may request utilization of a shared mobility service at the same time, or at distinct times.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for authorizing utilization of a mobility service by a user, the method comprising:
   establishing a mobility database with an arbiter, the database associated with the user and comprising biographic data, payment data and identification data, wherein the identification data represents a legal form of identification issued to the user, and wherein the payment data represents a form of payment;
   validating, by a computing device associated with the arbiter, the form of payment and the legal form of identification;
   receiving, at the computing device, a request by the mobility operator to authorize utilization of the mobility service by the user in connection with a request, by the user, to utilize said mobility service; and
   providing, by the computing device, in response to the request, an authorization when:
      the payment data represents sufficient funds to pay for the mobility service, and
      the identification data represents a legal form of identification required for the mobility service.

2. The computer-implemented method according to claim 1, wherein the legal form of identification issued to the user is selected from the group consisting of:
   a legal license issued to the user to operate a vehicle;
   a travel document issued to the user by a government;
   a national identification issued to the user by a government;
   a military identification issued to the user by a government;
   a residence permit issued to the user by a government;
   a birth certificate issued by a government;
   a social security card issued to the user by a government; and
   any combination thereof.

3. The computer-implemented method according to claim 1 further comprising, in connection with providing authorization, providing, by the computing device, a copy of the identification data to the mobility operator.

4. The computer-implemented method according to claim 1, wherein the mobility database further comprises permit data representing a legal license issued to the user to operate a vehicle; and
   wherein the method further comprises:
      validating, by the computing device, the legal license; and
      providing the authorization when, further, the permit data represents a legal license required by the mobility operator for the mobility service.

5. The computer-implemented method according to claim 4, further comprising, in connection with providing authorization, providing, by the computing device, a copy of the permit data to the mobility operator.

6. The computer-implemented method according to claim 4, wherein the vehicle is motorized, human-powered, animal-powered, autonomous or any combination thereof.

7. The computer-implemented method according to claim 1 further comprising:
   checking, by the computing device, that the data in the mobility database complies with one or more additional requirement; and
   refusing, by the computing device, the authorization when the one or more additional requirement is not complied with.

8. The computer-implemented method according to claim 7, wherein the one or more additional requirement is selected from the group consisting of the form of identification, the age of the user, the address of the user, the nationality of the user, the country of residence of the user, the expiry date of the form of identification, a correct form of insurance, a valid form of insurance, a minimum user rating, a minimum amount of previous usage, a minimum duration since the establishing of the relationship of the user with the arbiter, and any combination thereof.

9. The computer-implemented method according to claim 1, wherein the mobility database further comprises rating data; and
   wherein the method further comprises:
      receiving, from one or more mobility operators, the rating data; and
      checking, by the computing device, that the rating data complies with one or more additional requirement, the one or more additional requirement including a minimum rating of the user.

10. The computer-implemented method according to claim 1, wherein the mobility database further comprises service usage data; and
    wherein the method further comprises receiving, from one or more mobility operators, the service usage data.

11. The computer-implemented method according to claim 1, further comprising authenticating the user to the mobility operator based on data selected from the group consisting of a user name, an email address, a password, a pass phrase, a PIN, a challenge response, a security question, a QR code, a signature, a biometric identifier, a fingerprint, a security token, a software token, a hardware token, a voice scan, a face scan, a photograph of the user, and any combination thereof.

12. The computer-implemented method according to claim 11, wherein establishing the mobility database and validating the form of payment and the legal form of identification include establishing the mobility database and validating the form of payment and the legal form of identification before authenticating the user to the mobility operator.

13. The computer-implemented method according to claim 12, wherein validating the form of payment and the legal form of identification includes validating the form of payment and the legal form of identification at least several minutes before authenticating the user to the mobility operator.

14. The computer-implemented method according to claim 12, wherein establishing the mobility database includes establishing the mobility database at least several minutes before authenticating the user to the mobility operator.

15. The computer-implemented method according to claim 1, further comprising, in connection with providing of authorization, providing, by the computing device, a copy of the payment data to the mobility operator.

* * * * *